United States Patent
Narayan et al.

(10) Patent No.: US 9,118,400 B2
(45) Date of Patent: Aug. 25, 2015

(54) METHODS FOR MANAGING ALIGNMENT AND LATENCY IN INTERFERENCE SUPPRESSION

(71) Applicant: III Holdings 1, LLC, Wilmington, DE (US)

(72) Inventors: Anand P. Narayan, Bangalore (IN); Greg Graham, Boulder, CO (US); David R. Meyer, Lakewood, CO (US); Prashant Jain, Westminster, CO (US)

(73) Assignee: III HOLDINGS 1, LLC, Wilmington, DE (US)

( * ) Notice: Subject to any disclaimer, the term of this patent is extended or adjusted under 35 U.S.C. 154(b) by 0 days.

(21) Appl. No.: 14/490,961

(22) Filed: Sep. 19, 2014

(65) Prior Publication Data

US 2015/0010043 A1   Jan. 8, 2015

Related U.S. Application Data

(60) Division of application No. 13/314,787, filed on Dec. 8, 2011, now Pat. No. 8,842,786, which is a continuation of application No. 11/858,074, filed on Sep. 19, 2007, now Pat. No. 8,085,889, and a (Continued)

(51) Int. Cl.
*H04B 1/7097* (2011.01)
*G01S 5/02* (2010.01)

(Continued)

(52) U.S. Cl.
CPC .......... *H04B 1/7097* (2013.01); *G01S 5/0215* (2013.01); *G01S 19/22* (2013.01);

(Continued)

(58) Field of Classification Search
CPC .............................. H04B 1/7103; H04B 1/711
USPC .......... 375/147, 148, 355, 211, 214, 346, 347
See application file for complete search history.

(56) References Cited

U.S. PATENT DOCUMENTS

| 3,742,201 A | 6/1973 | Groginsky |
| 4,088,955 A | 5/1978 | Baghdady |

(Continued)

FOREIGN PATENT DOCUMENTS

| DE | 4201439 | 7/1993 |
| DE | 4326843 | 2/1995 |

(Continued)

OTHER PUBLICATIONS

Narayan et al., U.S. Appl. No. 11/858,074, filed Sep. 19, 2007, Response to Restriction Requirement and Amendment mailed Jul. 26, 2010, 4 pages.

(Continued)

*Primary Examiner* — Kevin Kim
(74) *Attorney, Agent, or Firm* — McAndrews, Held & Malloy, Ltd.

(57) ABSTRACT

An interference cancelling receiver combines data from multiple paths after aligning to transmitter timing, and uses either an equalizer or a Rake receiver to compute symbol estimates. Interference estimates are generated from the symbol estimates, and multiple interference estimates are combined after re-aligning the interference estimates to receiver timing. At least two segments of symbol estimates are computed for each segment of interference cancelled data.

Various techniques may be employed for controlling the latency and sequencing of these operations, and the subsystems within the canceller may use different processing clock speeds.

18 Claims, 8 Drawing Sheets

Related U.S. Application Data continuation-in-part of application No. 11/103,138, filed on Apr. 11, 2005, now Pat. No. 7,359,465, which is a division of application No. 10/247,836, filed on Sep. 20, 2002, now Pat. No. 7,158,559.

(60) Provisional application No. 60/845,594, filed on Sep. 19, 2006, provisional application No. 60/845,595, filed on Sep. 19, 2006, provisional application No. 60/846,213, filed on Sep. 21, 2006, provisional application No. 60/348,106, filed on Jan. 15, 2002.

(51) Int. Cl.
*G01S 19/22* (2010.01)
*H04B 1/7105* (2011.01)
*H04B 1/7117* (2011.01)
*H04B 1/7093* (2011.01)
*G01S 5/10* (2006.01)

(52) U.S. Cl.
CPC ........... *H04B 1/7093* (2013.01); *H04B 1/7105* (2013.01); *H04B 1/7117* (2013.01); *G01S 5/10* (2013.01); *H04B 2001/70935* (2013.01); *H04B 2201/70701* (2013.01); *H04B 2201/70715* (2013.01)

(56) References Cited

U.S. PATENT DOCUMENTS

| | | |
|---|---|---|
| 4,309,769 A | 1/1982 | Taylor, Jr. |
| 4,359,738 A | 11/1982 | Lewis |
| 4,601,046 A | 7/1986 | Halpern et al. |
| 4,665,401 A | 5/1987 | Garrard et al. |
| 4,670,885 A | 6/1987 | Parl et al. |
| 4,713,794 A | 12/1987 | Byington et al. |
| 4,780,885 A | 10/1988 | Paul et al. |
| 4,856,025 A | 8/1989 | Takai |
| 4,893,316 A | 1/1990 | Janc et al. |
| 4,922,506 A | 5/1990 | McCallister et al. |
| 4,933,639 A | 6/1990 | Barker |
| 4,965,732 A | 10/1990 | Roy, III et al. |
| 5,017,929 A | 5/1991 | Tsuda |
| 5,099,493 A | 3/1992 | Zeger et al. |
| 5,105,435 A | 4/1992 | Stilwell |
| 5,109,390 A | 4/1992 | Gilhousen et al. |
| 5,119,401 A | 6/1992 | Tsujimoto |
| 5,136,296 A | 8/1992 | Roettger et al. |
| 5,151,919 A | 9/1992 | Dent |
| 5,218,359 A | 6/1993 | Minamisono |
| 5,218,619 A | 6/1993 | Dent |
| 5,220,687 A | 6/1993 | Ichikawa et al. |
| 5,224,122 A | 6/1993 | Bruckert |
| 5,237,586 A | 8/1993 | Bottomley |
| 5,263,191 A | 11/1993 | Kickerson |
| 5,280,472 A | 1/1994 | Gilhousen et al. |
| 5,305,349 A | 4/1994 | Dent |
| 5,325,394 A | 6/1994 | Bruckert |
| 5,343,493 A | 8/1994 | Karimullah |
| 5,343,496 A | 8/1994 | Honig et al. |
| 5,347,535 A | 9/1994 | Karasawa et al. |
| 5,353,302 A | 10/1994 | Bi |
| 5,377,183 A | 12/1994 | Dent |
| 5,386,202 A | 1/1995 | Cochran et al. |
| 5,390,207 A | 2/1995 | Fenton et al. |
| 5,394,110 A | 2/1995 | Mizoguchi |
| 5,396,256 A | 3/1995 | Chiba et al. |
| 5,437,055 A | 7/1995 | Wheatley, III |
| 5,440,265 A | 8/1995 | Cochran et al. |
| 5,448,600 A | 9/1995 | Lucas |
| 5,481,570 A | 1/1996 | Winters |
| 5,506,865 A | 4/1996 | Weaver, Jr. |
| 5,513,176 A | 4/1996 | Dean et al. |
| 5,533,011 A | 7/1996 | Dean et al. |
| 5,553,098 A | 9/1996 | Cochran et al. |
| 5,602,833 A | 2/1997 | Zehavi |
| 5,644,592 A | 7/1997 | Divsalar et al. |
| 5,736,964 A | 4/1998 | Ghosh et al. |
| 5,787,130 A | 7/1998 | Kotzin et al. |
| 5,844,521 A | 12/1998 | Stephens et al. |
| 5,859,613 A | 1/1999 | Otto |
| 5,872,540 A | 2/1999 | Casabona et al. |
| 5,872,776 A | 2/1999 | Yang |
| 5,894,500 A | 4/1999 | Bruckert et al. |
| 5,926,761 A | 7/1999 | Reed et al. |
| 5,930,229 A | 7/1999 | Yoshida et al. |
| 5,953,369 A | 9/1999 | Suzuki |
| 5,978,413 A | 11/1999 | Bender |
| 5,995,499 A | 11/1999 | Hottinen et al. |
| 5,999,561 A * | 12/1999 | Naden et al. .................. 375/142 |
| 6,002,727 A | 12/1999 | Uesugi |
| 6,014,373 A | 1/2000 | Schilling et al. |
| 6,018,317 A | 1/2000 | Dogan et al. |
| 6,032,056 A | 2/2000 | Reudink |
| 6,078,611 A | 6/2000 | La Rosa et al. |
| 6,088,383 A | 7/2000 | Suzuki et al. |
| 6,101,385 A | 8/2000 | Monte et al. |
| 6,104,712 A | 8/2000 | Robert et al. |
| 6,115,409 A | 9/2000 | Upadhyay et al. |
| 6,127,973 A | 10/2000 | Choi et al. |
| 6,131,013 A | 10/2000 | Bergstrom et al. |
| 6,137,788 A * | 10/2000 | Sawahashi et al. ........... 370/342 |
| 6,141,332 A | 10/2000 | Lavean |
| 6,154,443 A | 11/2000 | Huang et al. |
| 6,157,685 A | 12/2000 | Tanaka et al. |
| 6,157,842 A | 12/2000 | Karlsson et al. |
| 6,157,847 A | 12/2000 | Buehrer et al. |
| 6,163,696 A | 12/2000 | Bi et al. |
| 6,166,690 A | 12/2000 | Lin et al. |
| 6,172,969 B1 | 1/2001 | Kawakami et al. |
| 6,175,587 B1 | 1/2001 | Madhow et al. |
| 6,192,067 B1 | 2/2001 | Toda et al. |
| 6,201,799 B1 | 3/2001 | Huang et al. |
| 6,215,812 B1 | 4/2001 | Young et al. |
| 6,219,376 B1 | 4/2001 | Zhodzishsky et al. |
| 6,222,828 B1 | 4/2001 | Ohlson et al. |
| 6,230,180 B1 | 5/2001 | Mohamed |
| 6,233,229 B1 | 5/2001 | Ranta et al. |
| 6,233,459 B1 | 5/2001 | Sullivan et al. |
| 6,240,124 B1 | 5/2001 | Wiedeman et al. |
| 6,252,535 B1 | 6/2001 | Kober et al. |
| 6,256,336 B1 | 7/2001 | Rademacher et al. |
| 6,259,688 B1 | 7/2001 | Schilling et al. |
| 6,263,208 B1 | 7/2001 | Chang et al. |
| 6,266,529 B1 | 7/2001 | Chheda |
| 6,269,075 B1 | 7/2001 | Tran |
| 6,275,186 B1 | 8/2001 | Kong |
| 6,278,726 B1 | 8/2001 | Mesecher et al. |
| 6,282,231 B1 | 8/2001 | Norman et al. |
| 6,282,233 B1 | 8/2001 | Yoshida |
| 6,285,316 B1 | 9/2001 | Nir et al. |
| 6,285,319 B1 | 9/2001 | Rose |
| 6,285,861 B1 | 9/2001 | Bonaccorso et al. |
| 6,301,289 B1 | 10/2001 | Bejjani et al. |
| 6,304,618 B1 | 10/2001 | Hafeez et al. |
| 6,308,072 B1 | 10/2001 | Labedz et al. |
| 6,310,704 B1 | 10/2001 | Dogan et al. |
| 6,317,453 B1 | 11/2001 | Chang |
| 6,321,090 B1 | 11/2001 | Soliman |
| 6,324,159 B1 | 11/2001 | Mennekens et al. |
| 6,327,471 B1 | 12/2001 | Song |
| 6,330,460 B1 | 12/2001 | Wong et al. |
| 6,333,947 B1 | 12/2001 | van Heeswyk et al. |
| 6,351,235 B1 | 2/2002 | Stilp |
| 6,351,642 B1 | 2/2002 | Corbett et al. |
| 6,359,874 B1 | 3/2002 | Dent |
| 6,362,760 B2 | 3/2002 | Kober et al. |
| 6,363,104 B1 | 3/2002 | Bottomley |
| 6,377,636 B1 | 4/2002 | Paulraj et al. |
| 6,380,879 B2 | 4/2002 | Kober et al. |
| 6,385,264 B1 | 5/2002 | Terasawa et al. |
| 6,396,804 B2 | 5/2002 | Odenwalder |
| 6,404,760 B1 | 6/2002 | Holtzman et al. |
| 6,430,216 B1 | 8/2002 | Kober |

(56) References Cited

U.S. PATENT DOCUMENTS

| | | |
|---|---|---|
| 6,459,693 B1 | 10/2002 | Park et al. |
| 6,496,551 B1 | 12/2002 | Dam et al. |
| 6,501,788 B1 | 12/2002 | Wang et al. |
| 6,515,980 B1 | 2/2003 | Bottomley |
| 6,570,909 B1 | 5/2003 | Kansakoski et al. |
| 6,574,270 B1 | 6/2003 | Madkour et al. |
| 6,580,771 B2 | 6/2003 | Kenney |
| 6,584,115 B1 | 6/2003 | Suzuki |
| 6,590,888 B1 | 7/2003 | Ohshima |
| 6,680,727 B2 | 1/2004 | Butler et al. |
| 6,771,988 B2 | 8/2004 | Matsuoka et al. |
| 6,798,737 B1 | 9/2004 | Dabak et al. |
| 6,801,565 B1 | 10/2004 | Bottomley et al. |
| 7,167,399 B2 | 1/2007 | Wooldridge |
| 2001/0003443 A1 | 6/2001 | Velazquez et al. |
| 2001/0020912 A1 | 9/2001 | Naruse et al. |
| 2001/0021646 A1 | 9/2001 | Antonucci et al. |
| 2001/0046266 A1 | 11/2001 | Rakib et al. |
| 2002/0001299 A1 | 1/2002 | Petch et al. |
| 2002/0051433 A1 | 5/2002 | Affes et al. |
| 2002/0172173 A1 | 11/2002 | Schilling et al. |
| 2002/0176488 A1 | 11/2002 | Kober |
| 2003/0053526 A1 | 3/2003 | Reznik |
| 2003/0123408 A1* | 7/2003 | Saitou ........................ 370/335 |
| 2003/0202499 A1* | 10/2003 | Thron et al. ................ 370/342 |
| 2004/0085918 A1* | 5/2004 | Shamsunder ............... 370/320 |
| 2006/0023775 A1 | 2/2006 | Rimini et al. |
| 2006/0053247 A1 | 3/2006 | Cheung et al. |
| 2006/0217080 A1 | 9/2006 | Nguyen et al. |
| 2009/0103656 A1* | 4/2009 | Chen ........................... 375/329 |

FOREIGN PATENT DOCUMENTS

| | | |
|---|---|---|
| DE | 4343959 | 6/1995 |
| EP | 0558910 | 9/1993 |
| EP | 0610989 | 8/1994 |
| GB | 2280575 | 1/1995 |
| JP | 2000-13360 | 1/2000 |
| WO | 93/12590 | 6/1993 |

OTHER PUBLICATIONS

Scharf, et al., "Matched Subspace Detectors," IEEE Transactions on Signal Processing, vol. 42, No. 8, Aug. 1994, 12 pages.
Price, et al., "A Communication Technique for Multipath Channels," Proceedings of the IRE, vol. 46, The Institute of Radio Engineers, New York, NY, US, Aug. 8, 1957, 16 pages.
Schlegel, Christian, Alexander, Paul and Roy, Sumit, "Coded Asynchronous CDMA and Its Efficient Detection," IEEE Transactions on Information Theory, vol. 44, No. 7, Nov. 1998, 11 pages.
Xie, Zhenhua; Short, Robert T. and Rushforth, Craig K., "A Family of Suboptimum Detectors for Coherent Multiuser Communications," IEEE Journal on Selected Areas in Communications, vol. 8, No. 4, May 1990, 8 pages.
Viterbi, Andrew J., "Very Low Rate Convolutional Codes for Maximum Theoretical Performance of Spread-Spectrum Multiple-Access Channels," IEEE Journal on Selected Areas in Communications, vol. 8, No. 4, May 1990, 9 pages.
Verdu, Sergio, "Minimum Probability of Error for Asynchronous Gaussian Multiple-Access Channels," IEEE Transactions on Information Theory, vol. IT-32, No. 1, Jan. 1986, 12 pages.
Behrens, Richard T. and Scharf, Louis I., "Signal Processing Applications of Oblique Projection Operators," IEEE Transactions on Signal Processing, vol. 42, No. 6, Jun. 1994, p. 1413-1424, 12 pages.
Alexander, Paul D., Rasmussen, Lars K, and Schlegel, Christian B., "A Linear Receiver for Coded Multiuser CDMA," IEEE transactions on Communications, vol. 45, No. 5, May 1997, 6 pages.
Schlegel, Christian; Roy, Sumit; Alexander, Paul D.; and Xiang, Zeng-Jun, "Multiuser Projection Receivers," IEEE Journal on Selected Areas in Communications, vol. 14, No. 8, Oct. 1996, 9 pages.
Halper, Christian; Heiss, Michael; and Brasseur, Georg, "Digital-to-Analog Conversion by Pulse-Count Modulation Methods," IEEE Transactions on Instrumentation and Measurement, vol. 45, No. 4, Aug. 1996, 10 pages.
Ortega, J.G.; Janer, C.L.; Quero, J.M.; Franquelo, L.G.; Pinilla, J.; and Serrano, J., "Analog to Digital and Digital to Analog Conversion Based on Stochastic Logic," IEEE 0-7803-3026-9/95, 1995, 5 pages.
Lin, Kun; Zhao, Kan; Chui, Edmund; Krone, Andrew; and Nohrden, Jim; "Digital Filters for High Performance Audio Delta-sigma Analog-to-Digital and Digital-to-Analog Conversions," Proceedings of ICSP 1996, Crystal Semiconductor Corporation, pp. 59-63, 5 pages.
Schlegel, C.B.; Xiang, Z-J.; and Roy, S., "Projection Receiver: A New Efficient Multi-User Detector," IEEE 0-7803-2509-5/95, 1995, 5 pages.
Affes, Sofiene; Hansen, Henrik; and Mermelstein, Paul, "Interference Subspace Rejection: A Framework for Multiuser Detection in Wideband CDMA," IEEE Journal on Selected Areas in Communications, vol. 20, No. 2, Feb. 2002, 16 pages.
Schneider, Kenneth S., "Optimum Detection of Code Division Multiplexed Signals," IEEE Transactions on Aerospace and Electronic Systems, vol. AES-15, No. 1, Jan. 1979, 5 pages.
Mitra, Urbashi, and Poor, H. Vincent, "Adaptive Receiver Algorithms for Near-Far Resistant CDMA," IEEE Transactions on Communications, vol. 43, No. 2/3/4, Feb./Mar./Apr. 1995, 12 pages.
Lupas, Ruxandra and Verdu, Sergio, "Near-Far Resistance of Multiuser Detectors in Asynchronous Channels," IEEE Transactions on Communications, vol. 38, No. 4, Apr. 1990, 13 pages.
Lupas, Ruxandra and Verdu, Sergio, "Linear Multiuser Detectors for Synchronous Code-Division Multiple-Access Channels," IEEE Transactions on Information Theory, vol. 35, No. 1, Jan. 1989, 14 pages.
Cheng, Unjeng, Hurd, William J., and Statman, Joseph I., "Spread-Spectrum Code Acquisition in the Presence of Doppler Shift and Data Modulation," IEEE Transactions on Communications, vol. 38, No. 2, Feb. 1990, 10 pages.
Behrens, Richard T. and Scharf, Louis L., "Parameter Estimation in the Presence of Low Rank Noise," 22ACSSC-12/88/0341, p. 341-344, Maple Press, 1988, 4 pages.
Iltis, Ronald A. and Mailaender, Laurence, "Multiuser Detection of Quasisynchronous CDMA Signals using Linear Decorrelators," IEEE Transactions on Communications, vol. 44, No. 11, Nov. 1996, 11 pages.
Mitra, Urbashi and Poor, H. Vincent, "Adaptive Decorrelating Detectors for CDMA Systems," accepted for Wireless Communications Journal, accepted May 1995, 25 pages.
Frankel et al., "High-performance photonic analogue-digital converter," Electronic Letters, Dec. 4, 1997, vol. 33, No. 25, p. 2096-2097, 2 pages.
Stimson, George W., "An Introduction to Airborne Radar," 2nd Edition, Sci Tech Publishing Inc., Mendham, NJ, 1998, p. 163-176 and 473-491, 40 pages.
Kaplan, Elliott D., Editor, "Understanding GPS—Principles and Applications," Artech House, Norwood MA, 1996, p. 152-236. (Provided publication missing p. 83-151 of cited reference.) 46 pages.
Rappaport, Theodore S., Editor, "Wireless Communications—Principles & Practice," Prentice Hall, Upper Saddle River, NJ, 1996, p. 518-533, 14 pages.
Best, Roland E., "Phase-Locked Loops—Design, Simulation, and Applications," 4th edition, McGraw-Hill, 1999, 23 pages.
Garg, Vijay K. and Wilkes, Joseph E., "Wireless and Personal Communications Systems," Prentice Hall PTR, Upper Saddle River, NJ, 1996, 45 pages.
Kohno, Ryuji, Imaj, Hideki, and Hatori, Mitsutoshi, "Cancellation techniques of Co-Channel Interference in Asynchronous Spread Spectrum Multiple Access System," May 1983, vol. J 56-A, No. 5, 8 pages.
Thomas, John K. "Thesis for the Doctor of Philosophy Degree," UMI Dissertation Services, Jun. 28, 1996, 117 pages. (Title: Canonical Correlations and Adaptive Subspace Filtering).
Viterbi, Andrew J., "CDMA—Principles of Spread Spectrum Communication," Addison-Wesley Publishing Company, Reading, MA, 1995, p. 11-75 and 179-233, 66 pages.

(56) References Cited

OTHER PUBLICATIONS

Behrens, Richard T., "Subspace Signal Processing in Structured Noise," UMI Dissertation Services, Ann Arbor, MI, Nov. 30, 1990, 166 pages.

Scharf, Louis L., "Statistical Signal Processing—Detection, Estimation, and Time Series Analysis," Addison-Wesley Publishing Company, 1991, p. 23-75 and 103-178, 74 pages.

Narayan et al., U.S. Appl. No. 11/858,074, filed Sep. 19, 2007, Office Action mailed Sep. 15, 2010, 7 pages.

Narayan et al., U.S. Appl. No. 11/858,074, filed Sep. 19, 2007, Response to Non-Final Office Action mailed Nov. 19, 2010, 8 pages.

Narayan et al., U.S. Appl. No. 11/858,074, filed Sep. 19, 2007, Office Action mailed Feb. 22, 2011, 7 pages.

Narayan et al., U.S. Appl. No. 11/858,074, filed Sep. 19, 2007, Response to Non-Final Office Action mailed Apr. 12, 2011, 8 pages.

Narayan et al., U.S. Appl. No. 11/858,074, filed Sep. 19, 2007, Corrected Response to Non-Final Office Action mailed Apr. 13, 2011, 8 pages.

Narayan et al., U.S. Appl. No. 11/858,074, filed Sep. 19, 2007, Notice of Allowance and Fee(s) Due mailed May 13, 2011, 18 pages.

Narayan et al., U.S. Appl. No. 11/858,074, filed Sep. 19, 2007, Request for Continued Examination mailed Aug. 9, 2011, 4 pages.

* cited by examiner

METHODS FOR MANAGING ALIGNMENT AND LATENCY IN INTERFERENCE SUPPRESSION

CROSS-REFERENCE TO RELATED APPLICATIONS

This application is a divisional of U.S. patent application Ser. No. 13/314,787, entitled "Methods for managing alignment and latency in interference suppression," and filed Dec. 8, 2011; which is a continuation of U.S. patent application Ser. No. 11/858,074, entitled "Methods for managing alignment and latency in interference cancellation," and filed Sep. 19, 2007, now U.S. Pat. No. 8,085,889; which (1) claims priority to U.S. Patent Application No. 60/845,594, entitled "Calculation of constant processing latency in a system with two locked clocks," and filed on Sep. 19, 2006; (2) claims priority to U.S. Patent Application No. 60/845,595, entitled "Latency and Clock Frequency Reduction Using Data Reuse in Interference Cancellation for Coded Systems," and filed Sep. 19, 2006; (3) claims priority to U.S. Patent Application No. 60/846,213, entitled "Real Time Implementation Techniques for Interference Cancellation," and filed Sep. 21, 2006; and (4) is a continuation-in-part of U.S. patent application Ser. No. 11/103,138, entitled "Serial cancellation receiver design for a coded signal processing engine," and filed on Apr. 11, 2005, now U.S. Pat. No. 7,359,465, which is a divisional of U.S. patent application Ser. No. 10/247,836, entitled "Serial cancellation receiver design for a coded signal processing engine," and filed on Sep. 20, 2002, now U.S. Pat. No. 7,158,559, which claims priority to U.S. Patent Application No. 60/348,106, entitled "Serial Receiver Design for a Coded Signal Processing Engine," and filed Jan. 14, 2002. The entirety of each of the foregoing patents, patent applications, and patent application publications is incorporated by reference herein.

This application also incorporates by reference in their entirety U.S. Patent Application No. 60/354,093, entitled "A Parallel CSPE Based Receiver for Communication Signal Processing," and filed Feb. 5, 2002; U.S. Patent Application No. 60/333,143, entitled "Method and Apparatus to Compute the Geolocation of a Communication Device Using Orthogonal Projection Methods," and filed Nov. 27, 2001; U.S. Patent Application No. 60/331,480, entitled "Construction of an Interference Matrix for a Coded Signal Processing Engine," and filed Nov. 16, 2001; U.S. Patent Application No. 60/326,199, entitled "Interference Cancellation in a Signal," and filed Oct. 2, 2001; U.S. Patent Application No. 60/325,215, entitled "An Apparatus for Implementing Projections in Signal Processing Applications," and filed Sep. 28, 2001; U.S. patent application Ser. No. 09/988,218, entitled "Interference Cancellation In a Signal," and filed Nov. 19, 2001, now U.S. Pat. No. 6,711,219; U.S. Patent Application No. 60/251,432, entitled "Architecture for Acquiring, Tracking and Demodulating Pseudorandom Coded Signals in the Presence of Interference," and filed Dec. 4, 2000; U.S. patent application Ser. No. 09/988,219, entitled "A Method and Apparatus for Implementing Projections in Signal Processing Applications," and filed Nov. 19, 2001, now U.S. Pat. No. 6,856,945; U.S. patent application Ser. No. 09/612,602, entitled "Rake receiver for spread spectrum signal demodulation," and filed Jul. 7, 2000, now U.S. Pat. No. 6,430,216; and U.S. patent application Ser. No. 09/137,183, entitled "Printed circuit board socket," and filed Aug. 20, 1998, now U.S. Pat. No. 5,928,035.

BACKGROUND

1. Field of the invention

The invention generally relates to the field of signal processing. More specifically the invention is related to aligning input signals for symbol estimation and re-aligning interference estimates for the purposes of interference cancellation.

2. Discussion of the Related Art

In an exemplary wireless multiple-access system, a communication resource is divided into subchannels that are allocated to different users. A plurality of subchannel signals received by a wireless terminal (e.g., a subscriber unit or a base station) may correspond to different users and/or different subchannels allocated to a particular user.

If a single transmitter broadcasts different messages to different receivers, such as a base station in a wireless communication system broadcasting to a plurality of mobile terminals, the channel resource is subdivided in order to distinguish between messages intended for each mobile terminal. Thus, each mobile terminal, by knowing its allocated subchannel(s), may decode messages intended for it from the superposition of received signals. Similarly, a base station typically separates received signals into subchannels in order to differentiate between users.

In a multipath environment, received signals are superpositions of time-delayed and complex-scaled versions of the transmitted signals. Multipath can cause several types of interference. Intra-channel interference occurs when the multipath time-delays cause sub channels to leak into other subchannels. For example, in a forward link, subchannels that are orthogonal at the transmitter may not be orthogonal at the receiver. When multiple base stations (or sectors or cells) are active, there may also be inter-channel interference caused by unwanted signals received from other base stations. Each of these types of interference can degrade communications by causing a receiver to incorrectly decode received transmissions, thus increasing a receiver's error floor. Interference may also have other deleterious effects on communications. For example, interference may lower capacity in a communication system, decrease the region of coverage, and/or decrease maximum data rates. For these reasons, a reduction in interference can improve reception of selected signals while addressing the aforementioned limitations due to interference.

Systems and methods for mitigating this interference have been developed, some of which perform cancellation of the pilot channels, and some of which perform cancellation of all the control and user/traffic channels present.

SUMMARY OF THE INVENTION

In view of the foregoing background, embodiments of the present invention may provide a generalized interference-canceling receiver for canceling intra-channel and interchannel interference in transmissions that propagate through frequency-selective communication channels.

Receiver embodiments may use this invention to perform alignment functions for the purposes of interference estimation and interference cancellation.

In one embodiment of the invention, a symbol estimator operates on a signal stream that is either a received signal, an interference cancelled signal, or a combination of the two in order to generate symbol estimates that are then used to produce interference estimates, which are aligned to a received signal boundary in order to produce a composite interference estimate.

The symbol estimation may be performed based on data that is combined using a Rake based structure or an equalizer based structure.

In another embodiment, a received signal is used to generate symbol estimates and interference estimates, and at least two segments of interference estimates are processed in order to generate a single segment of an interference cancelled signal. The symbol estimation uses a fast Hadamard Transform.

In another embodiment of the invention, sample level data is downsampled to chip level data, and then operated on to create symbol level data, which is then modified to create modified symbol level data. The modified symbol level data is then re-spread and interpolated to create sample level data.

In another embodiment of the invention, different subsystems within the receiver operate at different processing clock speeds in order to balance latency and processing requirements.

DESCRIPTION OF THE PREFERRED EMBODIMENTS

Figure 1:
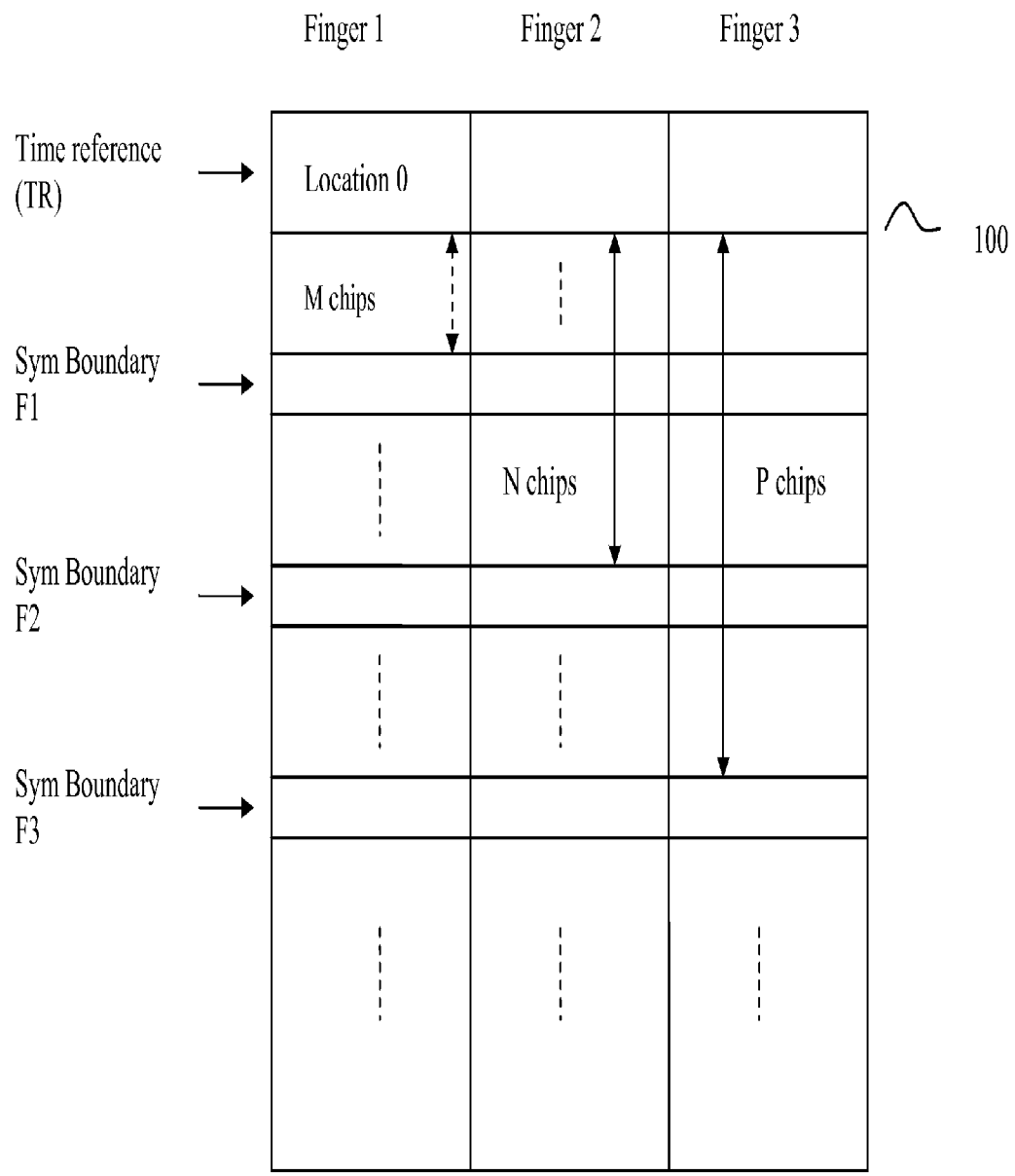
FIG. 1 shows a structure used to store Interference estimates.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Interference Cancellation systems comprise two major functions: estimating the interference and then removing the estimated interference. The interference experienced by a given signal path or ray is attributed to multi-paths from the same sector and paths from other sectors. The propagation time for the various multipaths from the transmitter to the receiver varies based on signal reflections from objects such as buildings, trees, etc. Different sectors might not be synchronized to each other, either because of different propagation times from the respective sectors, or because the sectors are deployed asynchronously, as is possible in some systems such as WCDMA and HSPDA. In effect, the signal paths arriving at the receiver can often be misaligned to each other's timing.

Interference estimation may be performed separately on each path, or once per sector. Interference Estimation consists of multiple steps, the sum of which in effect, is trying to reconstruct a replica of the transmitted signal(s). Interference estimation is preceded by the process of symbol estimation, which is the process of computing symbol estimates of the received user symbols. Interference estimation steps may include thresholding or weighing the symbol estimates, performing hard, soft or mixed decisions on the symbol estimates, and performing the functions present at the transmitter in order to reconstruct a replica of the signal as it would have been received. The interference estimates are then removed using projection or subtraction methods.

If interference estimation and removal is performed on a per path basis, alignment may be performed simply by adjusting the removal boundary to be the symbol boundary of the path being removed. Interference estimation and removal where multiple paths from a sector are involved, and where multiple asynchronous sectors are involved presents a more complicated situation of alignment. In such techniques, multiple paths from a single sector are combined either using some form of Rake combining such as Maximal Ratio Combining (MRC) or equalization. The equalization may be performed using an LMMSE equalizer or a Decision feedback Equalizer (DFE). The input per sector to an interference estimator is aligned to the sector's transmitter timing indicated by its symbol boundaries.

A symbol boundary marks the chip location in a received signal or a despread chip sequence from which point chips may be collected for a decovering (or de-Walshing) operation to be performed and yield valid symbol estimates. Symbol boundaries are well known in the art, and are the boundary locations in a transmitted or received chip sequence, which marks the beginning and end of the transmission of a symbol. In some systems, such as CDMA2000 and HSPDA, multiple symbol lengths are supported, in which case the symbol boundary refers to the boundary of any of the supported symbols.

The symbol boundary is related to the longest valid number of chips in a symbol, although, in certain types of interference cancellation, estimates may be made using lengths that are longer or shorter than a given symbol length.

For example, an interference canceller in a CDMA2000 system may perform symbol estimation on either 64 chips or 128 chips at a time. A WCDMA/HSDPA interference canceller may perform symbol estimation on 128, 256 or 512 chips.

In one preferred embodiment, all processing is performed at a single processing length, which determines the symbol boundary in use for the embodiment.

The starting point for symbol estimation is a received signal, which may either be a signal received over the air using a front-end, and then down-converted to baseband at a sampling rate that is usually higher than the chipping rate, or a signal that is the resultant product of an earlier stage of interference removal in an iterative or multi-stage implementation.

A searcher typically operates on a received signal to identify sectors and paths that are present in the received signal.

Multiple paths from a sector may be combined to form a single data stream input to the symbol estimator. The combination of multiple paths may be performed either using some form of Maximal Ratio Combining (MRC) or using equalization. In Rake based combining or MRC, all the paths of a sector are aligned to their transmitter timing (symbol boundaries) before being combined with each other, in proportion to their signal strength or SNR. This step also may include an optional phase rotation step, which typically uses the pilot channel in conjunction with the received signal stream. A despreading operation may also be performed. As an alternative to MRC combining, equalization may be performed on the received signal, which has the effect of creating a single stream of data, but with the effective mitigation of channel effects. A decision feedback equalizer structure may be employed for symbol estimation, where inter-symbol interference is mitigated as well.

After this combination which results in a single stream of data per sector, symbol estimation is performed using a symbol estimator which typically uses a fast Hadamard transform (also known as a fast Walsh transform).

The symbol estimator, which is coupled to the interference estimator, uses symbol boundary aligned data to estimate the symbol estimates on a per sector basis. After the symbol estimation, post-processing may be performed which include steps such as weighing or thresholding. Thresholding may be used to exclude symbol estimates of individual channels whose received strengths are weaker than a certain strength threshold, which may be a predetermined multiple of the derived noise floor. The noise floor may be derived from a combination of pilot and traffic channels, or just the pilot channel characteristics alone (e.g. it's level of AC energy). A weighing step generates weights for each symbol estimate based on a figure of merit of the symbol estimate such as signal strength or SNR and multiplies the symbol estimates by the weights.

The modified symbol estimates per sector are then used to create multiple interference estimates, each of which represent the interference from a given path of a given sector. Typical operations for this interference estimation include a covering operation, which may be applied to the sector as a whole, putting the spreading code back, and multiplying by a channel estimate on a per path basis, and using a combination of the transmit and receive filters in order to accurately reconstruct the interference from the given path.

The interference estimates are then interpolated to sample rate, in cases where the sampling rate is higher than the chipping rate in order to provide interference estimates at all samples, even those that do not correspond to a given chip location in a particular finger or ray.

The interference estimates are then re-aligned to the original receiver timing rather than to a symbol boundary and then combined in order to be used to produce an interference cancelled signal.

Since the arrival times of the different multipaths from the different sectors differ, particular care needs to be taken to ensure that alignment is maintained at various points in the receiver chain. In addition, the rates at which intermediate signals change must be managed.

In a preferred embodiment, a received analog signal is down converted to digital data at a rate faster than the chipping rate specified in the standard. For each multipath identified and tracked, a downsampler downconverts the data corresponding to that ray to its chipping rate, by only extracting the on-time sample. The on-time samples from multiple fingers of a particular source are then combined in order to extract symbol estimates using a Fast Hadamard transform module. Symbol estimates are generated at what is known as a symbol rate, and is related to the processing length chosen for the particular implementation. In an exemplary embodiment, the processing length is 128 chips. Symbol level data at the symbol rate is then modified using a post-processor which performs either thresholding or weighing. This modified symbol level data is then used to construct interference estimates by performing the operations performed at the transmitter such as covering and spreading, using an inverse fast Hadamard transform module (which is equivalent to a fast Hadamard transform module with some intermediate scaling steps), and a spreader. Performing covering or spreading on the symbol level data leads to chip level data, which may then be interpolated back to a sample rate.

The efficiency of implementing the interference cancellation algorithm(s) at any given time depends on the specific "environment" presented by all the input rays, the timing of which is recovered in the fingers. The environment of input fingers can be characterized by the number of different base stations (sectors) identified, fingers detected per sector (multipaths), the strength distribution of all fingers, and the relative temporal positions of the symbol boundaries for all of the fingers. When a radio (terminal) is in motion, these characteristic details change rapidly. If the input fingers happen to be time multiplexed in the radio, the time multiplexing may be removed as a first step to restore the original relative time positions of the fingers.

Embodiments of the invention include several techniques that may be used to implement the algorithm(s) while achieving a high performance/cost ratio.

1) One technique which offers operational efficiencies is to employ a common processing symbol boundary reference to be used for all fingers during the interference removal phase (not the estimation phase) based on a sorting of the offsets of the arrival times of the input fingers. One embodiment uses the boundary of the input finger identified by the sorting logic for the common processing boundary. Another embodiment creates a "virtual reference finger" that would initially be synchronized to the symbol boundaries of the input finger identified by the sorting logic, but when that input finger is deeply fading (even to the point of losing the time tracking of its symbol boundaries), the virtual reference finger boundaries would remain "locked" to the timing of where the original input finger was until the virtual reference finger no longer satisfied the sorting rules to be the reference. Virtual reference fingers are described in patent application, "Virtual Reference Timing for Multi-Time Based Systems," filed on Sep. 15, 2006, which is hereby incorporated by reference. When the virtual reference finger no longer satisfies the sorting rules it is resynchronized to the new input finger selected by the sorting logic.

An exemplary embodiment for the sorting logic is as follows:

A) Sort all fingers into groups where each group is the set of received multi-paths from a single base station (cell). This is done by comparing the PN sequences of all fingers at various time offsets relative to each other until all possible matches within the allowed "multi-path time window" are found. This window is the maximum allowed difference in arrival time between the first finger and last finger of a multi-path group. A typical multi-path time window may be ¼ of a symbol time since any multipaths which have arrival times more than ¼ of a symbol later than the first arriving finger of a sector may be too weak to be utilized efficiently in interference estimation. An enhancement may be used to improve performance in noisy environments where a finger may be included in a group even though its PN sequence doesn't exactly match that of the group for short periods of time. The mismatch rate allowed is a design parameter that trades off noise sensitivity with detection time and false detection rate.

B) Within each group (sector), find the first arriving finger (as defined by their symbol boundaries).

C) Measure the arrival time offsets between all the first arriving fingers of each group.

D) Find the pair of first arriving fingers that has the largest time offset, and select the finger of this pair that arrived last as the "reference finger." Hysteresis may be used to minimize sorting changes due to time variations of the fingers. This reference finger is the first arriving finger of the first arriving base station.

To put these techniques in context, an example of a system level embodiment utilizing these techniques follows:

1. Find a reference finger using the steps of the sorting logic outlined previously.
2. Within each group (sector), find the first or earliest arriving finger (as defined by their symbol boundaries). Create a sorted list starting with the reference finger and ending with the latest arriving fingers amongst the earliest arriving finger from each sector. This is the "first arriving finger" list.
3. Within each group (sector), find the last arriving finger (as defined by the symbol boundaries), and sort these fingers in order of arrival time after the reference finger's SBS (signal boundary strobe). This is the "last arriving finger" list.
4. Store the samples of all input fingers of sufficient strength in rolling 3 symbol memories (Input Finger Memory).
5. Wait for the SBS of the first element of the sorted "last arriving finger" list.
6. Read a whole symbol of 1× (on chip) samples of each finger (each multipath) of the first sector (as identified by the sorted "last arriving finger" list) from the Input Finger Memory. Note that these multipaths now have their symbol boundaries aligned to transmitter time (may not be aligned to receiver timing). Perform symbol and interference estimation on it.
7. Store the interference estimates for the current sector into a rolling three-symbol memory (Estimation Memory).
8. The Estimation Memory stores data such that address zero corresponds to the first interference estimate chip of the sector with the reference finger. Storage address (or write address) for other sectors is set by the offset between the reference finger and the first arriving finger of the sector being stored.

In another embodiment the use of the timing boundary of the reference finger can be replaced by an arbitrary reference timing signal (herein referred to as the arbitrary time reference, TR), which represents an arbitrary, but fixed reference time. FIG. 1 shows a storage structure that helps align the interference estimates to an arbitrary reference in time during data arrival at the receiver. RAMs (Random Access memories) can be used as the storage structures. Alternative embodiments for storage structures could be built using delay lines. The arbitrary time reference (TR) can be made to correspond to address zero in the RAM block. For every finger included in the estimation process, the offset between the TR and the finger's nearest symbol boundary after the reference is calculated. The offset can be calculated in chips or in samples (if oversampled data exists). For fingers whose offset in chips is not an exact integer multiple away from the reference time, the closest integer multiple is used. The interference estimates for sector 1 is stored in the RAM 100 such that the chip corresponding to the symbol boundary of the first arriving finger of the sector is stored in a location exactly M address locations away, where M chips is the offset in chips between the reference time and the symbol boundary of the first arriving finger. Similarly, sectors 2 and 3 are stored at the Nth and pth location, corresponding to their first arriving finger's offsets' (N and P chips) from the reference time. The above method of storing data aligns the sectors' interference estimates with respect to the TR. Every location of the RAM now stores reference time aligned interference estimates for the sectors used in the interference summation. The embodiment assumes a scenario where all three sectors have one finger each. If a sector has more than 1 finger used in the interference estimation process, all its fingers interference estimates can be generated using the sector interference estimates. The RAM may store multiple symbols of data per sector and multiple such RAMs may be used.

One embodiment of removing the estimated interference using an interference removal module sums the estimates of interfering signals and subtracts (or projects) it either from the original received signal at the receiver or an interference removed signal that may be the product of a previous iteration or stage of interference cancellation. The input to the summer of the interference estimates spans multiple sectors and their multipaths. The inputs at the summer should be aligned with respect to their arrival time at the receiver, which may cause misalignment of their symbol boundaries with respect to each other.

Figure 2:
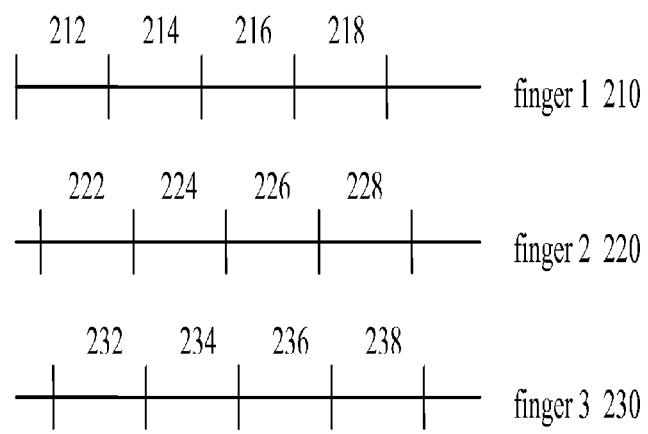
FIG. 2 shows fingers aligned to the receiver timing.
Figure 3:
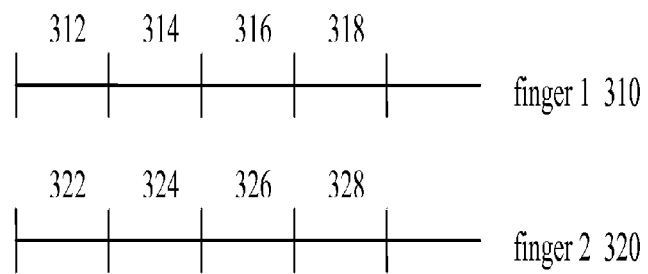
FIG. 3 shows multipath fingers aligned to their symbol boundaries.

FIG. 2 shows 3 paths aligned to their arrival time at the receiver. Their symbol boundaries, an indicator of their transmitter timing are shown as vertical lines. Finger 1 (path 1) and finger 2 are multi-paths of each other, while finger 3 is a path from another sector. FIG. 3 shows the alignment of fingers 1 and 2 when they are combined with each other for interference estimation. Finger 1 data is delayed to match the symbol boundaries of finger 2 before combining the two fingers and providing the composite to the symbol estimator's input.

Figure 4:
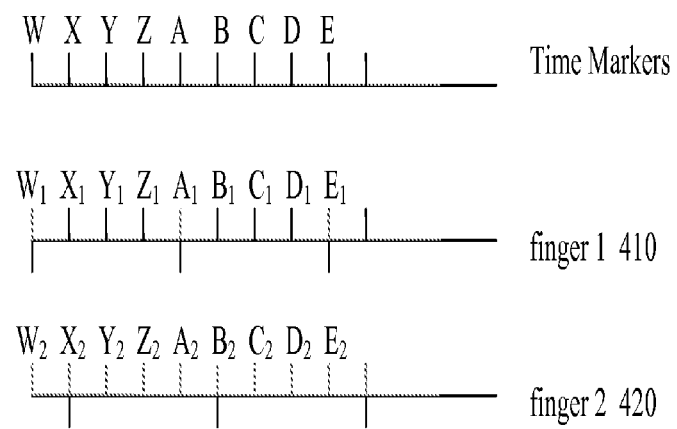
FIG. 4 shows the sample and chip points of interference estimates aligned to receiver timing before summation of the interference estimates.

The input to the estimator is at chip rate and may have been decimated from a data set with a higher sample rate than the chip rate, e.g. four times the chip rate (4×), referred to as the sampling rate. The interference estimates at the point at which they are summed together have to be aligned to their arrival timing at the receiver. But, the chips corresponding to the interference estimate of a path may not be aligned to the interference estimate chips from other paths. FIG. 4 shows an example of a 4× system with two fingers with different chip alignments as well as the 4× sample points. Interference estimates are present only at samples points $W_1$, $A_1$, etc. for finger 1 and $X_2$, $B_2$, etc. for finger 2. For correct summation of the interference estimates, the estimates at the intermediate sample points are required. For e.g. to obtain a summed interference data sample for time point A, samples $A_1$ and $A_2$ are required. While $A_1$ may be available from the estimator since it corresponds to finger 1's chip markers, the closest data samples to $A_2$ that are available are $X_2$ and $B_2$ corresponding to finger 2's chip markers. An interpolator solves the problem where $A_2$ can be obtained by performing an interpolation using multiple interference estimate samples that are available at finger 2's chip markers.

FIG. 2 shows the alignment of the interference estimates of the fingers when being summed together. This does not necessarily align the symbol boundaries of all the fingers that were estimated. Instead the alignment is based on the arrival timing of each path at the receiver. The summed interference is then removed from the corresponding uncanceled data stream that is a composite of all the signals as received at the receiver. The un-canceled data was stored before the interference estimation process to be used in the interference removal stage. The summation contains interference estimates for all fingers that were estimated except the finger that is being improved.

Figure 5:
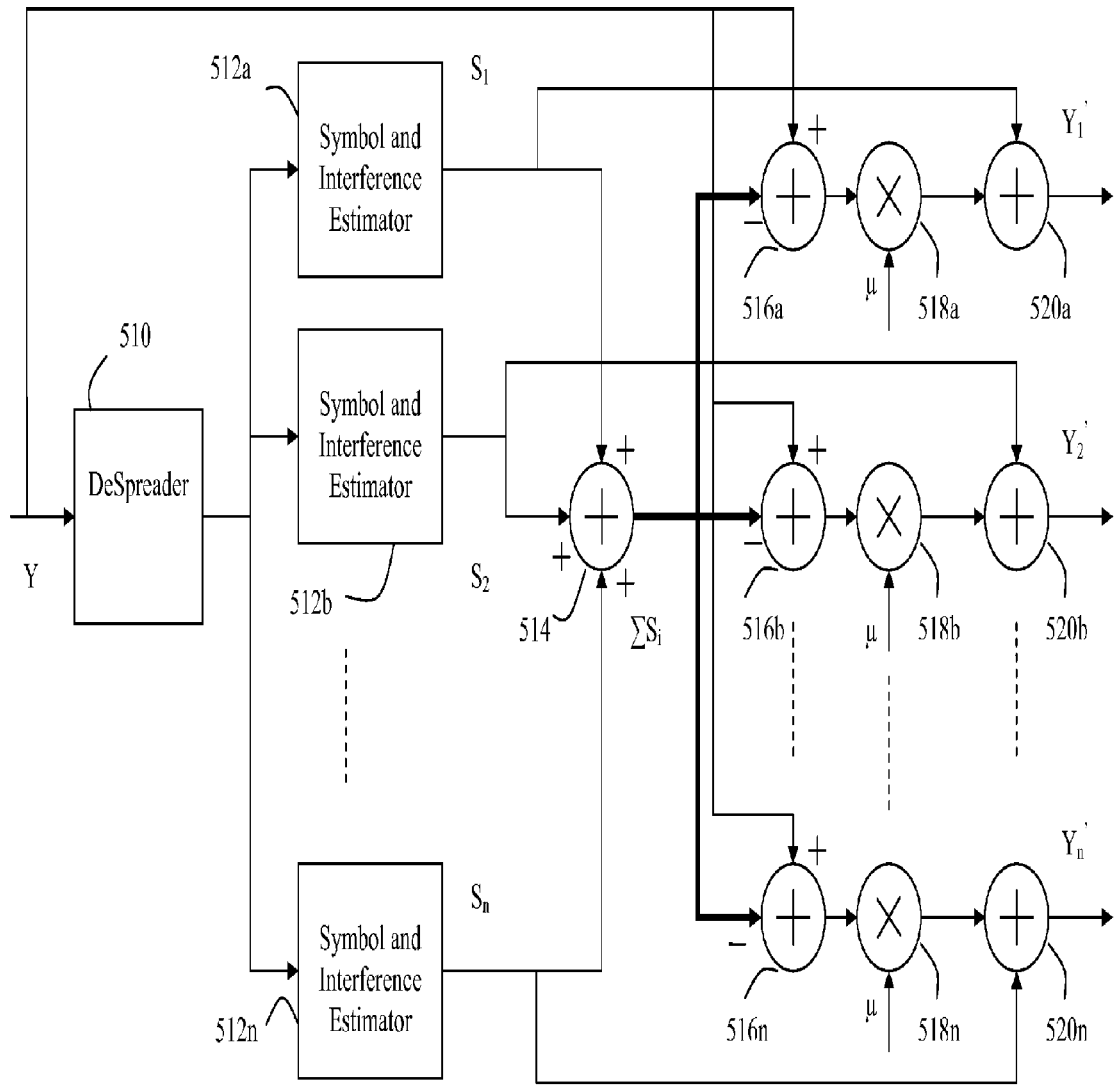
FIG. 5 shows an interference cancellation system.

One embodiment of the interference removal module is where estimated interference is summed for all fingers. The sum is then subtracted from the un-canceled data stream, while adding back the individual interference estimates obtaining interference removed versions for individual fingers as shown in FIG. 5. For e.g. the interference removed version for finger 1 and finger 3 are shown in equations 1 and 2, where Y is the uncanceled data stream, $S_1$ and $S_3$ are interference estimates for fingers 1 and 3, $Y_1'$ and $Y_3'$ are interference removed versions of fingers 1 and 3 and μ is a weighting factor that may offer stabilization for the interference removal process. The summation of S over all fingers estimated is indicated by $\Sigma S_i$ performed by summer 514. The subtraction of the summation of interference estimates of all fingers from Y is performed by 516a to 516n. The result can be multiplied (using multipliers 518a-518n) by μ which can be held constant over all fingers. The estimated interference term added back (using summers 520a-520n) decides the finger that has interference removed from it.

$$Y'_1=\mu(Y-\Sigma S_i)+S_1 \quad (1)$$

$$Y'_3=\mu(Y-\Sigma S_i)+S_3 \quad (2)$$

An alternative embodiment for removing interference does not use the weighting factor μ as shown in equation 3 for finger 1. In this embodiment, the cancellation is implemented as $$Y'_1=Y-\Sigma S_i+S_1 \quad (3)$$

Another iteration of interference estimation and removal can be repeated using interference canceled data from a previous pass. Interference estimation and removal can be iterated multiple times based on the performance, latency, clock frequency and area trade-offs available. Iteration could provide improved interference estimates over the previously calculated estimates, thus removing more of the interference in the system. Multiple such iterations of interference estimation and removal can be performed using the previous iteration's canceled output as an input to the next iteration's estimation process. This would require realignment of the canceled data, since it is the input for the next iteration's estimation process and will have to be realigned to symbol boundaries. FIG. 2 shows the data alignment when data enters the interference removal stage while FIG. 3 shows data alignment at the input of the symbol estimation stage coupled with interference estimation. In a system with multiple iterations, each stage follows the other and requires the data aligned accordingly.

Figure 6:
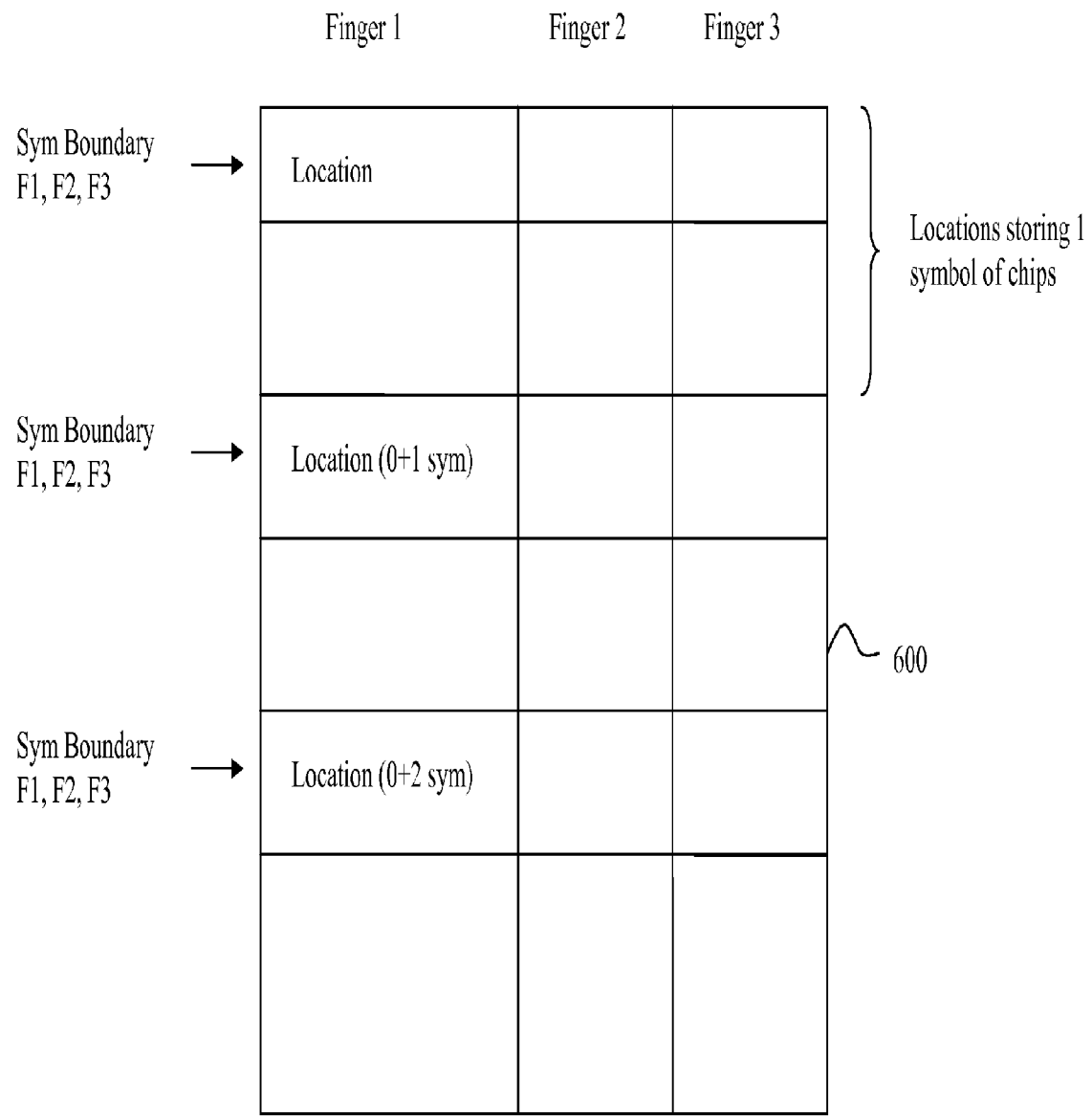
FIG. 6 shows a structure used to store cancelled data for the next iteration of interference cancellation.

FIG. 6 shows a storage structure consisting of a RAM 600 used to align the canceled data back to symbol boundaries. All the fingers' canceled data is made available with their symbol boundary indicators. The chip enable indicators may be available if the cancellation output is at the sample rate. Only samples corresponding to chip enable indicators are stored since the estimation process only uses chip-rate (1×chip) data as input. The data is stored such that anytime a symbol boundary indicator is encountered for a finger, the write address for the finger in the RAM 600 is reset to 0, and the chip corresponding to the symbol boundary is stored in address 0. Every finger will have its data aligned to its symbol boundary corresponding to the location with address 0. Reading data from address 0 for all fingers within a sector will provide symbol boundary aligned data which can be combined and sent to the interference estimator. The RAM 600 may store multiple symbol worth of data per finger and multiple RAMs may be used.

FIG. 2 shows finger 1, illustrated as reference numeral 210 and having segments or symbols 212, 214, 216, 218; finger 2, illustrated as reference numeral 220 and having symbols 222, 224, 226, 228; and finger 3, illustrated as reference numeral 230 and having symbols 232, 234, 236, 238 where time increases in the direction of increasing symbol reference number. A finger's symbol boundary is not aligned to all other finger's symbol boundaries as illustrated in the figure. In order to remove the estimated interference of finger 1 from symbol 222 of finger 2 it is necessary to have processed segments 212 and 214. Similarly, to process segment 224 with the interference of finger 1 (210) removed it is necessary to have processed segments 214 and 216. The interference removal stage requires data to be aligned to the receiver timing. The process of realigning symbol boundary aligned data to receive timing alignment requires two symbols worth of interference estimation. Thus for every symbol interference removed, interference is required to be estimated for two symbols. The estimation and removal may be done in multiple symbol segments as well.

As the number of iterations increase the latency may increase prohibitively. To keep the latency in check, some performance can be traded by re-using a previous iteration's interference estimates in the interference removal stage. For e.g. to remove interference from symbol 224 of finger 2 in the 3rd iteration, we need the 3rd iteration interference estimates of symbols 214 and 216 from finger 1 and symbols 232 and 234 from finger 3. It is possible that the 3rd iteration interference estimates are available only for symbols 214, 232 and 234. In this case the system could wait for future interference estimation to provide the 3rd iteration interference estimates for symbol 216 or use the 2nd iteration estimates for symbol 216, based on its latency requirements. The same re-use technique can be used for interference removed data from the previous iteration when it is being aligned to symbol boundaries providing input to the interference estimation process of the next iteration. In general, if data required for symbol estimation or interference removal is not completely available for a given iteration, the unavailable data can be substituted with data from a previous iteration.

Symbol and interference estimation requires at least a complete symbol of data to calculate estimates. During the first pass the estimation block waits to receive at least a complete symbol at the receiver. For iterations past the first pass, the estimation block awaits interference removal of at least a complete symbol before estimation can begin. Meanwhile, the interference removal process can work on individual samples without requiring interference estimates for the complete symbol, though it does need interference estimates for all fingers whose estimates are being summed at a given point in time. The output of the interference estimation block may occur in bursts. The estimation burst size can be fixed for a given system. The interference removal block's output can also occur in bursts, where the burst size can be fixed or variable. The aim is to send out a continuous stream of interference canceled data at a constant rate to the rake receiver as it would expect to get without an interference cancellation system, thus minimizing the changes required outside the interference cancellation system. A storage system like a FIFO can be used at the output of the interference canceller which can help maintain the continuous data stream to the rake receiver, even if the input to the FIFO is in bursts. The FIFO status information (full, empty, etc.) can be used to control the burst rate and size of the stored estimates into the interference removal block to generate interference canceled data.

One efficient segmentation (burst) size may be one fourth of a symbol because that is the allowed multipath distribution time window mentioned above. In this embodiment the number of such bursts will be four which will equal a symbol worth of interference estimates.

Another embodiment of the interference removal system can have a variable number of segments (bursts) and uses the arbitrary timing reference (TR). The RAM 100 with the interference estimates stores the chips corresponding to the arbitrary timing reference (TR) in the location with address zero. The timing reference is repeated as a pulse periodically with the repetition period equal to the total latency of the system from data input to the interference removed output. The output of the interference cancellation system is the input to the Rake receiver.

The un-canceled data is stored prior to the interference estimation. The timing control block (TCB) that generates the TR also starts a timer, based on the TR, which counts up to the latency of the system and then rolls over. When the timer reaches a preset value, defined by the interference removal block latency plus the output FIFO worst case delay, a request is sent to the block with the RAM 100 storing interference estimates. The RAM 100 may read the interference estimates corresponding to the TR (address zero as shown in FIG. 1) based on the request pulse from the TCB.

The un-canceled data is stored until ready to be used in the interference removal stage. When the location corresponding to address zero is read from the RAM 100 storing interference estimates, a TR indicator is generated and tagged to the data read.

The interference removed data is sent out to the Rake receiver (or equalizer) in the final iteration of interference cancellation and is stored in a FIFO as mentioned above. The writing to the FIFO occurs as the cancelled data is made available to it. The cancelled data at the input to the FIFO is accompanied by the TR marker, while the address to which the data corresponding to the marker is written is noted. The TCB uses its internal timer to send out a request signal to the FIFO to read out the samples corresponding to the TR marker, such that the total latency of the system remains constant. The TCB thus helps maintain the total latency of the interference cancellation system constant. The output FIFO uses one or more of its AlmostEmpty and/or AlmostFull flags to decide the burst size and rate of the interference estimates out of the RAM 100. This method also minimizes the depth (and therefore the cost) of the output FIFO.

Any iteration of interference cancellation that is not the final iteration uses a slightly different method to burst interference estimates out of the RAM 100. The interference estimates are read when the estimates corresponding to all sectors for a given address location are available. The read address is incremented sequentially. The read requests of estimates for multiple iterations are sent to an arbiter that gives the later iterations a higher priority than the ones before it. The control of the RAM is relinquished after reading one chip worth of data for all sectors.

The interference cancellation process of symbol and interference estimation and interference removal may require a higher clock than used in the Rake receiver. It is commonplace for systems to consist of two or more subsystems, each governed by its own independent clock, unlocked in phase or frequency with the other subsystem. In addition, a processing subsystem may require a variable amount of time in order to process data. An embodiment as presented provides for synchronizing inputs and outputs of these two unsynchronized subsystems without a priori knowledge of the processing time. The embodiment enables synchronization without a requirement to share clock signals or timing information from either subsystem across subsystem boundaries. All timing calculations that are required for synchronization are computed within one of the subsystems.

Figure 7:
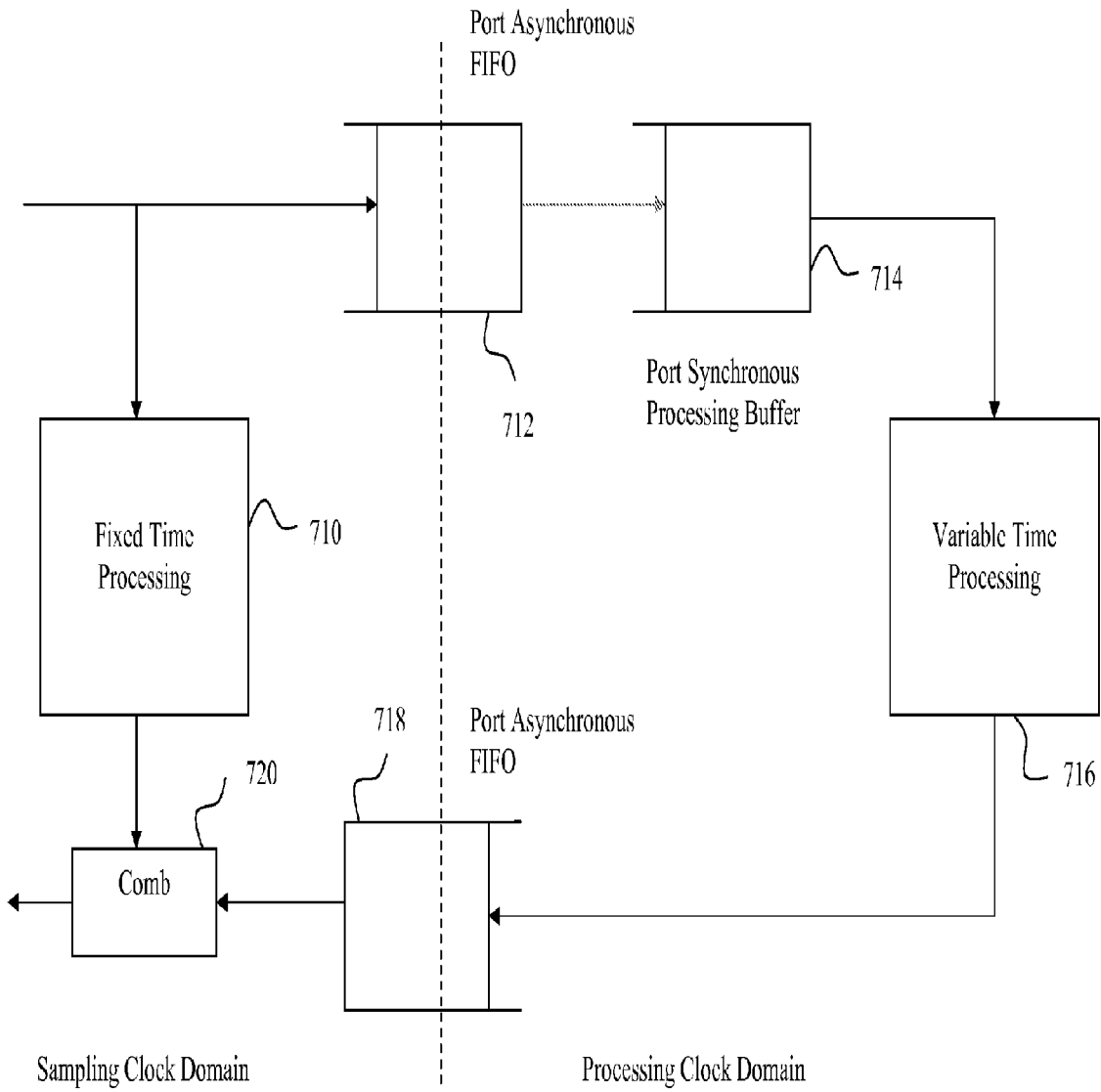
FIG. 7 shows a synchronization system with port asynchronous FIFO.

A synchronization system is illustrated in FIG. 7, wherein a clock signal from a sampling clock domain is shared across the timing boundary with a processing clock domain. A general data-processing system comprises a data-sampling clock and a data-processing clock. The data-sampling clock produces new data every clock period. In a simple system, the two clocks are typically phase and frequency locked. A data processing block operates on the data presented by the data-sampling clock and computes new results within a predetermined set time. A general requirement of the system is that a constant stream of correlated data be presented to downstream data consumers. This requires that the effective processing time be constant. If the data computation exceeds a desired maximum processing time, or if the data computation time is variable, a more complex system is required.

An advanced system includes a processing block with an input and output FIFO. The data-processing clock may or may not be frequency/phased locked to the data-sampling clock, although, in general, it will be a higher clock rate that is not phase locked. Both the input and output FIFOs are port asynchronous. This indicates that the respective read and write port clocks are neither frequency nor phase locked. Data enters the processing block via the input FIFO. The depth of the input FIFO is small since the processing clock is greater than or equal to the sampling clock. The data is then stored in a port synchronous buffer for use by the processing block.

Figure 8:
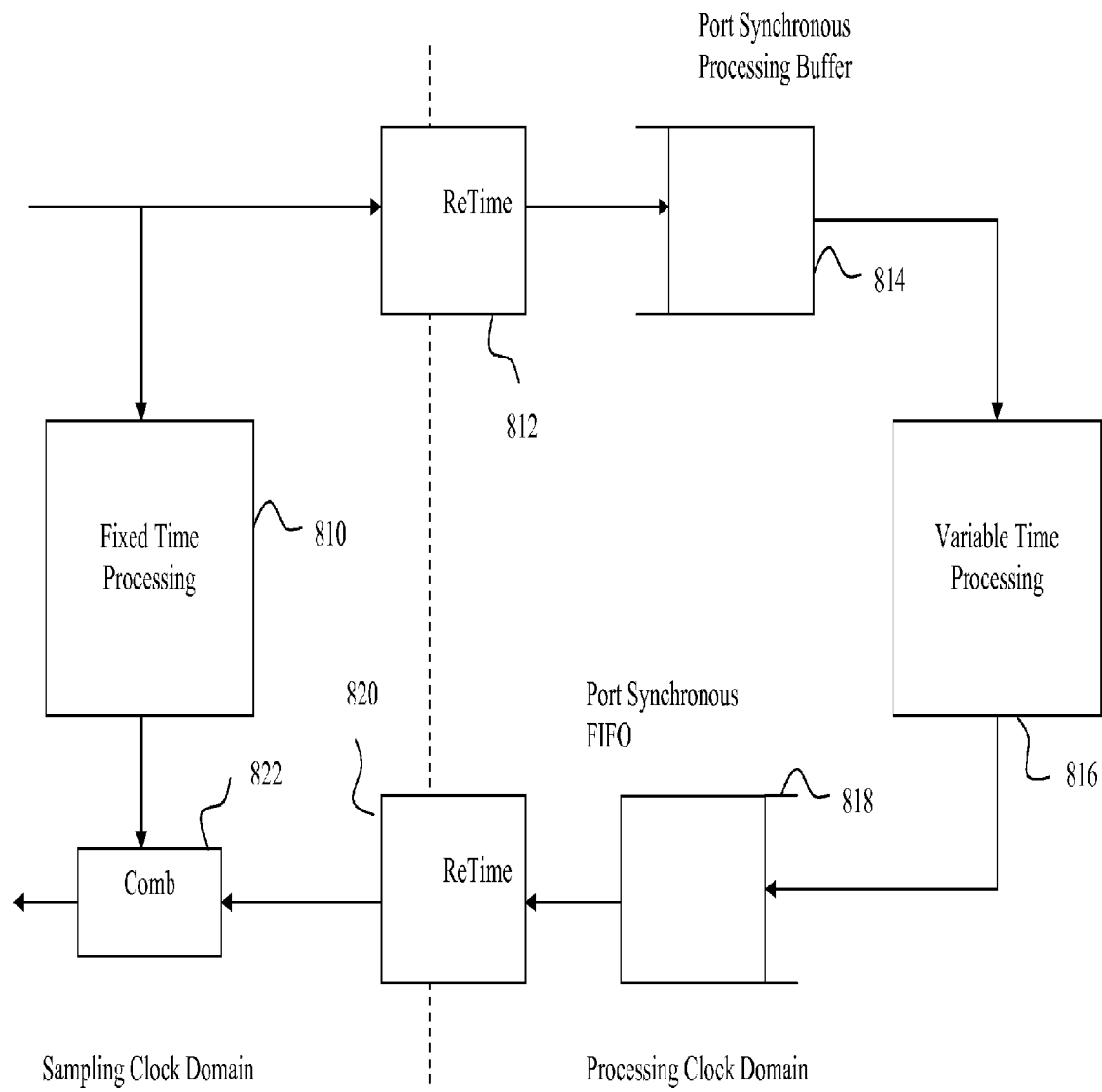
FIG. 8 shows a synchronization system with port synchronous FIFO.

FIG. 8 illustrates an embodiment in which the port asynchronous output FIFO of FIG. 7 is replaced by a port synchronous FIFO and a retiming circuit. The FIFO provides delay control for the processing data path and the retiming circuit provides the clock domain interface between the sampling clock and the processing clock domains. A port synchronous FIFO is used so that the read address does not have to be retimed across clock domains and therefore introduce uncertainty in the write address calculation. The processing clock to sampling clock ratio is limited to a minimum of 3. The write side operates strictly in the processing clock domain, but the read side must retime the data to the sampling clock.

At time 0, an output word from the sampling system is written into the input retiming circuit, whose fixed delay is known to be $T_{sp}$. At time $T_{sp}$, this word is written into the port synchronous processing buffer at input time $T_W^i = T_{sp}$, which is time-stamped to the corresponding sampling time. The word is held for delay $\Delta^i$ in the processing buffer, awaiting availability of the processor P, whose processing time $\Delta^P$ is variable, but bounded. After the variable delay of $\Delta^i + \Delta^P$, the processed word is written into the port synchronous output FIFO at write time $T_W^o$ and stored for delay $\Delta_o$. The output FIFO write pointer that affects the storage delay $\Delta^o$ is to be computed according to this invention. After the output FIFO, the word is processed through the output retiming circuit, which has a delay of $T_{ps}$.

In one embodiment, a fixed delay of 512 (an arbitrary number, in units of samples or chips, selected to illustrate the idea, without loss of generality) is desired between the sample 0 into the input re-timing circuit and sample 512 out of the re-timing FIFO. From FIG. 8, the requirement to synchronize the processed word with the sampling system is expressed by a first equation, $$512 = T_{sp} + \Delta^i + \Delta^P + \Delta^o + T_{ps}$$

wherein 512 is the target delay in samples, $T_{sp}$ and $T_{ps}$ are known delays, in samples, and the remaining delays are unknown. The delay $\Delta^i$ may be determined from the difference between the read and write times into the input port synchronous processing buffer, namely $$\Delta^i = T_R^i + T_W^i$$

In one embodiment of the invention, the time $T_W^i$ is time-stamped to the sampling system and this time (or address) is given to the time $T_R^o$ (0) on the read channel of the port synchronous output FIFO. With $\Delta^i$ determined from timing addresses within the processing system, one of which is explicitly time-stamped and the other of which is synchronously locked to this address, the first equation may be re-written as $$512 - T_{sp} - \Delta^i - T_{ps} = \Delta^p + \Delta^o$$

An assumption may be made that processor P consumes data in bursts with predefined idle times between the bursts. This property is used to calculate the output FIFO write address without knowledge of the processing delay $\Delta^p$. When the beginning of the burst is read from the processing buffer, the output FIFO write address can be calculated as follows:

$$\Delta^{o'} = 512 - T_{sp} - T_{ps} - \Delta^i$$

$$W^o = R^o + \Delta^o$$

This write-address value is used to store the first word of data that exits the processor P. Note that during processing time $\Delta^p$ of the first word, the output FIFO read pointer increments by a time amount equivalent to $\Delta^p$. This implicitly calculates the processing time $\Delta^p$, i.e.

$$\Delta^{o'} = \Delta^o \Delta^p$$

Note that an additional assumption is made that the maximum processing time $\Delta^p$ does not exceed the minimum output buffer time $\Delta^o$. Since the processing clock frequency is assumed to be greater than the sampling clock frequency, the rest of the data burst from the processor P will be stored in the output FIFO ahead of the corresponding read access of the data.

The A/D converter at the front end of the receiver samples data at a rate higher than the chipping rate. The higher sampling rate is denoted as N×, while the chip rate is denoted as 1×. The sample rate (N×) is converted to the chip rate (1×) before the interference estimation process which uses 1× data. The N× data is accompanied with chip enable indicators at the chips of a finger. The chip enable indicators can be used to pick 1× data from an N× stream of data. The 1× data stream is then aligned to its symbol boundaries before the symbol and interference estimation process. The interference estimates stay at the 1× rate till the input of the interpolator. The interpolator creates N× data samples from the 1× data samples, creating an N× data stream for all fingers. Using RAM 100, the 1× input data to the interpolator was aligned to the closest chip point. Any left over sample level alignment is performed using delay lines on the N× data stream at the output of the interpolator. The interference removal can be performed at the sample level (N×) data rate. The interference removed data can then be stripped back to 1× data rate using stored chip enable indicators corresponding to the un-canceled data. Alternatively, the chip enable indicators can be regenerated using the symbol boundary information per finger. The interference removed 1× rate data can be sent out to the rake receiver or used in another iteration of interference cancellation.

It should be clear that this invention described herein may be realized in hardware or software, and there are several modifications that can be made to the order of operations and structural flow of the processing.

Those skilled in the art will recognize that this invention may be realized in a chipset or a handset that is implemented for downlink processing, as well as a chipset or a basestation implemented for uplink processing.

Those skilled in the art should recognize that method and apparatus embodiments described herein may be implemented in a variety of ways, including implementations in hardware, software, firmware, or various combinations thereof. Examples of such hardware may include Application Specific Integrated Circuits (ASICs), Field Programmable Gate Arrays (FPGAs), general-purpose processors, Digital Signal Processors (DSPs), and/or other circuitry. Software and/or firmware implementations of the invention may be implemented via any combination of programming languages, including Java, C, C++, Matlab™, Verilog, VHDL, and/or processor specific machine and assembly languages.

Computer programs (i.e., software and/or firmware) implementing the method of this invention may be distributed to users on a distribution medium such as a SIM card, a USB memory interface, or other computer-readable memory adapted for interfacing with a consumer wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g., a microprocessor) to act in accordance with the method of this invention. All these operations are well known to those skilled in the art of computer systems.

The functions of the various elements shown in the drawings, including functional blocks labeled as "modules" may be provided through the use of dedicated hardware, as well as hardware capable of executing software in association with appropriate software. When provided by a processor, the functions may be performed by a single dedicated processor, by a shared processor, or by a plurality of individual processors, some of which may be shared. Moreover, explicit use of the term "processor" or "modulecircuit" should not be construed to refer exclusively to hardware capable of executing software, and may implicitly include, without limitation, digital signal processor DSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope.

Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it IS intended that such equivalents include both currently known equivalents as well as equivalents developed in the future, i.e., any elements developed that perform the same function, regardless of structure.

We claim:

1. A chipset for receiving a signal, the chipset comprising:
a front end configured to receive a signal;
an analog-to-digital converter configured to sample the signal at a sample rate that is greater than or equal to a chipping rate to produce sample-rate data;
a downsampler configured to convert sample-rate data to a chipping rate to create chip-level data;
a symbol estimator configured to operate on chip-level data to create symbol-level data;
a post-processor configured to operate on symbol-level data to produce modified symbol-level data;
a respreader configured to apply a spreading code to the modified symbol-level data to create chip-level data indicative of a plurality of chip-level interference estimates; and
an interpolator configured to interpolate the chip-level data to create sample-level data indicative of a plurality of sample-level interference estimates.

2. The chipset of claim 1, wherein the symbol estimator is configured to operate at a different clock speed than the analog-to-digital converter.

3. The chipset of claim 1, wherein the symbol estimator uses a Fast Hadamard Transform.

4. The chipset of claim 1, wherein the post-processor is further configured to exclude symbol-level data having a received strength less than a threshold strength derived from a noise floor.

5. The chipset of claim 1, wherein the post-processor is further configured to weight symbol-level data based on a measure of merit.

6. The chipset of claim 1, further comprising an interference removal module configured to subtract sample-level data indicative of sample-level interference estimates from sample-rate data to obtain an interference cancelled signal.

7. A method, comprising:
receiving a signal with a front end of a receiver;
sampling the signal, with an analog-to-digital converter, at a sample rate that is greater than or equal to a chipping rate to produce sample-rate data;
downsampling the sample-rate data to a chipping rate to create chip-level data;
estimating symbol-level data based on the chip-level data;
operating on the symbol-level data to produce modified symbol-level data;
applying a spreading code to the modified symbol-level data to create chip-level data indicative of a plurality of chip-level interference estimates; and
interpolating the chip-level data to create sample-level data indicative of a plurality of sample-level interference estimates.

8. The method of claim 7, wherein said sampling the signal operates at a different clock speed than said estimating.

9. The method of claim 7, wherein said operating comprises creating the symbol-level data based on a Fast Hadamard Transform.

10. The method of claim 7, further comprising excluding symbol-level data having a received strength less than a threshold strength derived from a noise floor.

11. The method of claim 7, further comprising weighting symbol-level data based on a measure of merit.

12. The method of claim 7, further comprising subtracting sample-level data indicative of sample-level interference estimates from sample-rate data to obtain an interference cancelled signal.

13. A non-transitory computer readable storage medium, comprising a plurality of instructions, that in response to being executed, result in a receiver:
sampling a signal at a sample rate that is greater than or equal to a chipping rate to produce sample-rate data;
downsampling the sample-rate data to a chipping rate to create chip-level data;
estimating symbol-level data based on the chip-level data;
operating on the symbol-level data to produce modified symbol-level data;
applying a spreading code to the modified symbol-level data to create chip-level data indicative of a plurality of chip-level interference estimates; and
interpolating the chip-level data to create sample-level data indicative of a plurality of sample-level interference estimates.

14. The non-transitory computer readable storage medium of claim 13, wherein the plurality of instructions further result in the receiver sampling the signal at a different clock speed than the receiver estimates the symbol-level data.

15. The non-transitory computer readable storage medium of claim 13, wherein the plurality of instructions further result in the receiver creating the symbol-level data based on a Fast Hadamard Transform.

16. The non-transitory computer readable storage medium of claim 13, wherein the plurality of instructions further result in the receiver excluding symbol-level data having a received strength less than a threshold strength derived from a noise floor.

17. The non-transitory computer readable storage medium of claim 13, wherein the plurality of instructions further result in the receiver weighting symbol-level data based on a measure of merit.

18. The non-transitory computer readable storage medium of claim 13, wherein the plurality of instructions further result in the receiver subtracting sample-level data indicative of sample-level interference estimates from sample-rate data to obtain an interference cancelled signal.

* * * * *